United States Patent [19]

Shaffer et al.

[11] Patent Number: 5,084,551

[45] Date of Patent: Jan. 28, 1992

[54] POLYPHENYLENE ETHER PROCESS AND RESIN COMPOSITION

[75] Inventors: Timothy D. Shaffer, Fort Worth, Tex.; James G. Bennett, Jr., Albany; Mark R. Denniston, Altamont, both of N.Y.

[73] Assignee: General Electric Co., Selkirk, N.Y.

[21] Appl. No.: 626,598

[22] Filed: Dec. 12, 1990

[51] Int. Cl.$^5$ .............................. C08G 65/22
[52] U.S. Cl. .................. 528/219; 528/215; 528/216
[58] Field of Search ............... 528/219, 215, 216

[56] References Cited

U.S. PATENT DOCUMENTS

| | | | |
|---|---|---|---|
| 3,306,874 | 2/1967 | May | 528/215 |
| 3,306,875 | 2/1967 | Hay | 528/215 |
| 3,365,422 | 1/1968 | Van Dort | 528/214 |
| 3,639,656 | 2/1972 | Bennett et al. | 528/215 |
| 3,642,699 | 2/1972 | Cooper et al. | 528/215 |
| 3,661,848 | 5/1972 | Cooper et al. | 528/215 |
| 3,733,299 | 5/1973 | Cooper et al. | 528/215 |
| 3,838,102 | 9/1974 | Bennett et al. | 528/486 |
| 3,914,266 | 10/1975 | Hay | 556/110 |
| 4,028,341 | 6/1977 | Hay | 528/215 |
| 4,042,564 | 8/1977 | Bennett et al. | 528/215 |
| 4,083,828 | 4/1978 | Olander | 525/215 |
| 4,092,294 | 5/1978 | Bennett et al. | 528/215 |
| 4,806,602 | 2/1989 | White et al. | 525/397 |

OTHER PUBLICATIONS

Percec, V. and Shaffer, T. D., "Funchonal Polymers and Sequential Copolymers . . . ," J. Pol. Sci. Part C: Polymer Letters, 24, 439–446 (1986).

Primary Examiner—John Kight, III
Assistant Examiner—Kathryne E. Shelborne
Attorney, Agent, or Firm—Francis T. Coppa; Joseph T. Eisele

[57] ABSTRACT

The invention provides a process for producing a polyphenylene ether by subjecting a 2,6-dialkyl-4-halophenol to oxygen in the presence of a water-immiscible solvent, an aqueous alkali, a phase transfer agent, and a molecular-weight-controlling amount of an amine having at least one hydrogen on the amine nitrogen. The polyphenylene ether thus produced has improved flow properties, color and odor, and is suitable for polymer blending with styrenic resins.

25 Claims, 2 Drawing Sheets

POLYPHENYLENE ETHER PROCESS AND RESIN COMPOSITION

BACKGROUND OF THE INVENTION

1. Field of the Invention

The invention is directed to a polymerization process and catalyst system for the production of polyphenylene ethers of controlled molecular weight. Polyphenylene ethers made by this process have improved flow and other advantageous properties, and are useful as components of thermoplastic molding blends.

2. Brief Description of the Prior Art

The polyphenylene ethers and processes for their preparation are known in the art and described in numerous publications, including Hay, U.S. Pat. Nos. 3,306,874 and 3,306,875. Other procedures are described by Van Dort, U.S. Pat. No. 3,365,422, Bennett and Cooper, U.S. Pat. Nos. 3,639,656, 3,642,699, 3,733,299, 3,838,102, 3,661,848 and 4,092,294, and Olander, U.S. Pat. No. 4,083,828. All of these patents are incorporated herein by reference.

The processes most generally used to produce the polyphenylene ethers involve the self-condensation of a monohydroxy phenol in the presence of an oxygen-containing gas and a catalyst, generally a metal salt or complex.

Improved catalyst systems have been developed for the preparation of polyphenylene ethers by the oxidative coupling of 2,6-di-substituted phenolic compounds. Such systems are disclosed in the above-noted U.S. Pat. No. 4,092,294. This patent discloses a catalyst which comprises a copper compound; a diamine wherein the two amino nitrogens are separated by at least two and no more than three carbon atoms, and the carbon atom to which the amino nitrogen is attached is aliphatic; a tertiary amine and a bromine-containing compound selected from the group consisting of hydrogen bromide, alkali metal bromides, alkaline earth metal bromides, 4-bromophenols and mixtures thereof plus an amount of a primary or secondary monoamine, most frequently a secondary monoamine of the formula RNHR' wherein R and R' are lower alkyl.

The use of some of the known catalyst systems for preparing polyphenylene ethers results in the incorporation of the primary or secondary monoamine into aminomethyl groups located not only at the terminal phenol of the polymer chain but also at various non-terminal phenylene ether units along the chain. Thus no simple stoichiometric ratio exists between the number of molecules of the amine used and the number of polymer chains formed. Moreover, these multiple aminomethyl groups may serve as a source of odoriferous breakdown products during thermal processing of the polyphenylene ether such as in preparation of moldable blends.

An alternative process for polyphenylene ethers has been described by Percec and Shaffer, J. Polym. Sci.: Part C: Polymer Letters, vol. 24, 439–446 (1986). In this process, 4-bromo-2,6-dimethylphenol is polymerized in the presence of toluene, aqueous sodium hydroxide, a phase-transfer catalyst (tetrabutylammonium hydrogen sulfate) and air. Although this process avoids the use of metals, it still does not afford effective means for molecular weight control.

The processes described above all have the disadvantage of not affording a convenient means for reliably attaining any predetermined molecular weight. It is desired for example to be able to limit the molecular weight in a controlled manner so as to obtain polyphenylene ethers which have improved flow properties, and which are easier to blend with other polymers. Typical attempts to control the molecular weight of polyphenylene ethers have involved changing the catalyst-to-monomer (phenol) ratio, the monomer feed rates, and the rate of oxygen uptake. Other attempts have focused on adding a nonsolvent to the reaction, thereby precipitating the polymer at a certain molecular weight. These methods are tedious, give inadequate control, and often lead to polymer recovery problems.

The products made according to the above-cited known copper and manganese-catalyzed processes, moreover, tend to be contaminated by side products of the reactions, namely 3,3',5,5'-tetraalkyl-4,4'-diphenoquinone, a colored compound. This side product usually gets incorporated to some degree into the polymer chain, thus leading to polymer chains with two phenolic ends, further complicating the product composition, causing broadened and less reproducible molecular weight distributions. Moreover, the products made by the above-described process often have traces of heavy metal compounds (catalyst residues) as impurities, further impairing color, stability and electrical properties of blends made using these products.

The process of my invention makes available control over molecular weight, and makes available new polyphenylene ethers of controlled molecular weight, controlled nitrogen content and essential freedom from diphenoquinone, from incorporated diphenoquinone structures, and from heavy metal compounds. The process makes available new and improved polyphenylene ethers which have improved and more reproducible flow properties, and which are readily blended with other compatible thermoplastics to afford blends of reduced odor, color, improved stability and improved electrical properties.

SUMMARY OF THE INVENTION

The aforedescribed objectives are achieved in my improved process for making a poly(2,6-dialkylphenylene) ether by subjecting the corresponding 2,6-dialkyl-4-halophenol to air in the presence of a substantially water-immiscible solvent, an aqueous alkali, an effective polymerization catalyzing amount of a phase transfer agent, and an effective molecular-weight-controlling amount of an amine having at least one hydrogen on the amine nitrogen, this nitrogen being further bound only to aliphatic carbon atoms. This oxidation process is conducted in the substantial absence of any heavy metal catalysts, such as copper or manganese compounds.

DETAILED DESCRIPTION OF THE INVENTION

Figure 1:
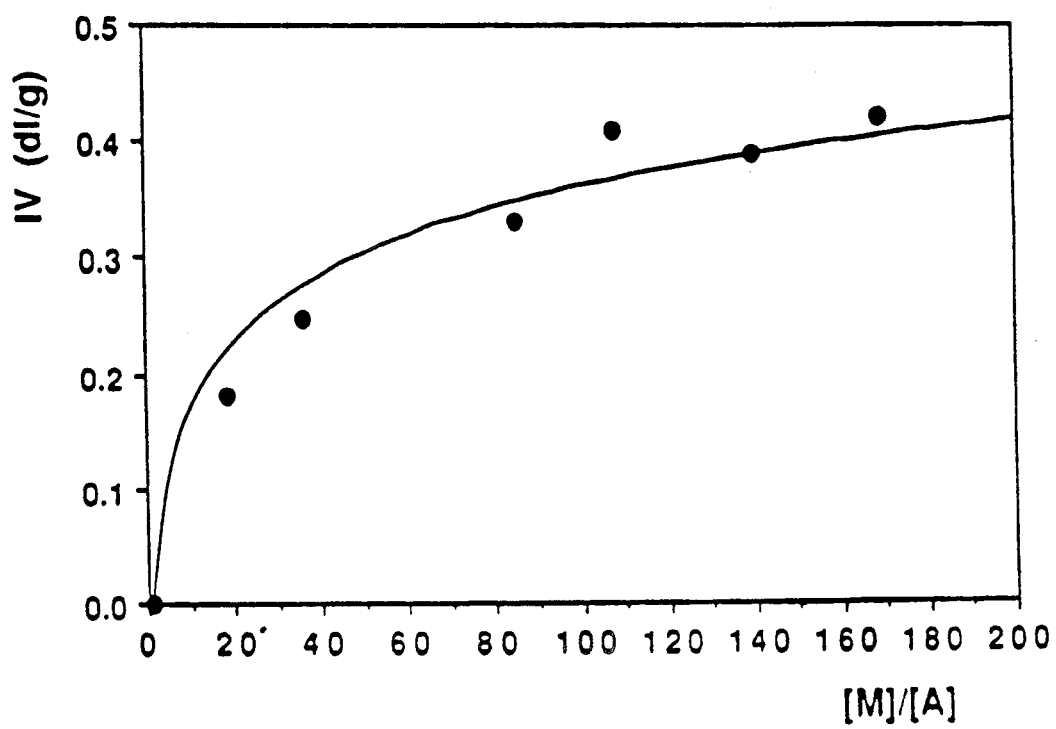
FIG. 1 is a graphical representation showing the dependence of molecular weight as measured by intrinsic viscosity on the relative concentration of di-n-butylamine (DBA), described in [M]/[A].

In its composition aspect, the invention provides easily-processible poly(2,6-dialkylphenylene) ethers of controlled molecular weight and good flow properties, essentially free of diphenoquinone, incorporated diphenoquinones and heavy metal contaminants by the above-described process. The invention also provides blends of these polyphenylene ethers having the advantages of good flow (easy processibility), low color, and freedom from metal contaminants.

For brevity, the term "molecular weight" (if not otherwise specified as number average molecular weight) as used herein means "weight average molecular weight ($M_w$)". The determination of $M_w$ for a polyphenylene ether resin may be by any known method. A convenient method is by gel permeation chromatography using polystyrene standards; see for example U.S. Pat. No. 4,477,651 incorporated herein by reference thereto. When absolute numerical values are not required, i.e., when relative weight average molecular weights will suffice, such values may be determined from the intrinsic viscosity (I.V.) of a given resin as described more fully hereinafter.

The following discussion presents the manner and process of conducting the process of the invention and preparing the product of the invention, and the best method of carrying out the invention.

The process of the invention comprises an oxidative polymerization for the preparation of polyphenylene ethers which comprise a plurality of structural units having the formula:

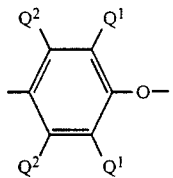

In each of said units independently, each $Q^1$ is independently halogen, primary or secondary lower alkyl (i.e. alkyl containing up to 7 carbon atoms), phenyl, haloalkyl, hydrocarbyloxy or halohydrocarbyloxy wherein at least two carbon atoms separate the halogen and oxygen atoms; and each $Q^2$ is independently hydrogen, halogen, primary or secondary lower alkyl, phenyl, haloalkyl, hydrocarbyloxy or halohydrocarbyloxy as defined for $Q^1$. The term "hydrocarbyloxy" as used herein means the monovalent moiety of the formula —O— hydrocarbon. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. The preferred polyphenylene ethers that are prepared by the process of the invention are those wherein both $Q^1$ radicals are hydrocarbon radicals having from 1 to 8 carbon atoms and $Q^2$ are each hydrogen or one $Q^2$ is hydrogen and the other is a hydrocarbon radical having from 1 to 8 carbon atoms. The especially preferred polyphenylene ethers are those where both $Q^1$ are methyl and at least one $Q^2$ is hydrogen and one or no $Q^2$ is methyl. The preferred polyethylene ethers are those which are made by polymerization of 2,6-dimethylphenol or combinations thereof with 2,3,6-trimethylphenol. Further discussion of the structure of polyphenylene ethers is found, for instance, in U.S. Pat. No. 4,806,602 which is incorporated herein by reference.

The polymers thus formed by the process of the invention will hereinafter be called, for brevity, polyphenylene ethers, and it will be understood that such polyphenylene ethers have substituents as defined above.

The phenols which are the starting material for the oxidative polymerization are those which have the same substituents $Q^1$ and $Q^2$ together with a substituent X in the 4 position, as shown by the formula:

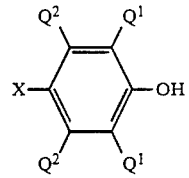

where X is a halogen, preferably bromine or chlorine. These phenols when described herein for brevity as 2,6-disubstituted phenols are meant to include those which have one or two additional substituents as hereinabove defined, in the 3 and/or 5 position.

The oxygen required for the process of the invention may be provided as pure oxygen or as air, at atmospheric, subatmospheric or superatmospheric pressure. It is not consumed in stoichiometric amounts so all that is required is that it be present as a principal constituent of the atmosphere to which the reaction mixture is exposed. Oxygen concentrations of from about 0.01% to 100% are usable, but the reaction will proceed more slowly with the lower concentrations. A convenient concentration of oxygen is that of air (about 21%). It is adequate to merely stir the reaction mixture under air, although air or oxygen or an oxygen-containing gas can also be bubbled through the mixture. In the practice of the process of the present invention, the amount of the solvent is not critical, it only being necessary that the solvent provide a liquid phase for the phenol starting material. Suitable solvents are any substantially water-insoluble and substantially inert organic solvent, examples including aliphatic hydrocarbons such as octane or cyclohexane and aromatic hydrocarbons such as benzene, toluene, xylene, methylnaphthalenes, cumene, pseudocumene, or the like. The solvents may be chlorinated alkali-resistant solvents, such as chloroaromatic solvents, exemplified by chlorobenzene, orthodichlorobenzene, chlorotoluene, trichlorobenzene and the like. Other solvents mentioned in the Hay patents described above may also be employed. However, it is advantageous to employ an inert aromatic solvent such as benzene or toluene as the reaction medium. The term "inert aromatic solvent" means an aromatic solvent which does not enter into or adversely affect the desired course of the reaction.

The alkali to be used can be any substantially water-soluble base sufficiently alkaline to afford some of the anion of the phenolic starting material. Thus, suitable alkalis include the alkali metal hydroxides and carbonates, exemplified by lithium, sodium and potassium hydroxides or carbonates, and calcium hydroxide. Quaternary ammonium bases such as tetramethylammonium hydroxide can be used also. However, for reasons of economy and freedom from side reactions, the alkali metal hydroxides are preferred. The amount of alkali or other strong base per mole of monomer (i.e. 2,6-di-substituted phenolic compound) may range from slightly over one mole per mole of monomer to about 50 moles per mole of monomer, with the preferred range being from about 5 to about 10 moles of strong base per mole of monomer.

The phase transfer agent for use in the process of the invention may advantageously be a quaternary ammonium compound, although it could also be a quaternary phosphonium compound or a crown ether. Representative of the quaternary ammonium compounds are compounds of the formula $$[N(R^1)(R^2)(R^3)(R^4)]^+ X^-$$

wherein $R^1$, $R^2$, $R^3$, and $R^4$ are alkyl, aralkyl or alkenyl groups of from 1–24 carbon atoms and $X^-$ is an anion. The preferred anions are halides (such as bromide or chloride), sulfate or phosphate.

Mixtures of the ammonium salts may also be employed and preferably the total number of carbon atoms in the $R^1$, $R^2$, $R^3$, and $R^4$ substituents should be at least 10. The reaction catalyzing concentration of the quaternary ammonium salts is in the range of from 50–10,000 ppm based on the organic reaction solvent, and more preferably 100–2000 ppm, based on the organic reaction solvent.

The alkyl substituents of the quaternary ammonium compound may be methyl, ethyl, propyl, butyl, hexyl, octyl, decyl, cetyl, hexadecyl, and isomers thereof. Mixtures of these groups may also be employed. The aralkyl (i.e. alkyl substituted by aryl) substituent may include such radicals having from 7 to 20 carbon atoms such as benzyl, phenethyl and the like. The alkenyl substituents include straight and branched chain unsaturated hydrocarbon radicals of from 1 to 24 carbon atoms which contain one or more double bonds.

The quaternary ammonium compounds are well known and many are commercially available. For example, reference may be made to Kirk-Othmer Encyclopedia of Chemical Technology, 2nd Edition, Vol. 16, pp. 859–865; Arquads, Armour Industrial Co. (1956) and Schwartz, A. M. et al., Surface Active Agents, Vol. I, pp. 156–171, Interscience Publishers (1949); and Vol. II, pp. 112–118 (1958). A particularly useful material available commercially under the name Adogen ® 464 (Aldrich Chemical Co.) has the composition methyltrialkyl($C_8$–$C_{10}$)ammonium chloride.

The molecular-weight-controlling amine is an amine having at least one hydrogen on the amine nitrogen, this nitrogen being free of aryl substituents directly bound to nitrogen. Examples are the aliphatic amines, including cycloaliphatic amines, for example, mono- and dimethylamine, mono- and diethylamine, mono- and dipropylamine, mono- and dibutylamine, mono- and di-sec-propylamine, mono- and dibenzylamine, mono- and dicyclohexylamine, mono- and diethanolamine, ethylmethylamine, methylpropylamine, allylethylamine, methylcyclohexylamine, morpholine, methyl-n-butylamine, ethylisopropylamine, benzylmethylamine, octylbenzylamine, octyl-chlorobenzylamine, methyl(phenylethyl)amine, benzylethylamine, di(chlorophenylethyl)amine, 1-methylamino-2-phenylpropane, 1-methylamino-4-pentene, etc. Thus, provided that the hydrocarbyl group is not an aryl, any mono- or dihydrocarbylamine can be used, including those substituted with non-interfering substituents such as chlorophenyl, hydroxy or alkoxy.

If there are two substituents on the nitrogen, they can be conjoined to form a ring by direct carbon-to-carbon bonding or through a non-interfering heteroatom such as an oxygen. The preferred hydrocarbyl groups are alkyls of from 1 to 12 carbon atoms unbranched at the alpha position to the nitrogen; such branching makes the amine less effective in molecular weight control. Tertiary branching (i.e. a tertiary carbon atom) at the alpha position makes the amine least effective. Also preferred are the cyclic secondary amines having no branching at the carbon atoms alpha to the amine nitrogen; morpholine, piperidine and pyrrolidine exemplify this type of preferred amine.

The molecular weight controlling primary or secondary amine must be present in an amount less than one mole per mole of phenolic monomer. If present in equal or greater amounts, no polymer is formed. The minimum amount is determined by the largest molecular weight of polymer that is desired, but the use of amounts less than 0.001 mole per mole of monomer afford little increase in molecular weight. A preferred amount of the amine is from about 0.1 to about 0.005 mole per mole of monomer.

The process of the invention is conducted in the substantial absence of heavy metals, such as the copper or manganese compounds utilized in the prior art processes. However, if traces of such metals occur adventitiously in, for example, the water or other reagent, it is not necessary to remove them.

The reaction temperature is broadly from the freezing point of the aqueous base up to about the boiling point, although the preferred range is from about 5° C. to about 80° C. and most preferred is from ambient to about 60° C.

The reaction time is from about 10 minutes to about 100 hours, preferably about 1 to 50 hours. The reaction is advantageously terminated when the conversion of monomer (phenol) to polymer reaches about 90 to about 95 %, which can be ascertained by isolation of polymer from a reaction batch sample, determination of released halide ion, infrared, nmr or other analytical means. Longer times can cause undesirable overoxidation to take place with formation of colored and excessively nitrogen-rich polymer products. Shorter times cause inadequate conversion.

The process of the invention makes available polyphenylene ether resins of controlled molecular weight, low color and substantial freedom from heavy metal content, these resins being suitable for blending with styrenic thermoplastic resins to make useful blended plastics of especially low color, good stability and good electrical properties. The flow properties are superior to those of the polyphenylene ethers made using the copper or manganese salt catalysts. Furthermore, these polyphenylene ether resins are thought to possess lower odor levels as compared to some of the resins of the prior art.

The styrenic resins with which the polyphenylene ether resins are blended to produce useful plastic molding blends are well known and will comprise at least 25% by weight of units derived from monomers of the formula:

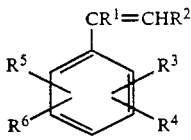

wherein $R^1$ and $R^2$ are selected from the group consisting of (lower) alkyl or alkenyl groups of from 1 to 6 carbon atoms and hydrogen; $R^3$ and $R^4$ are selected from the group consisting of hydrogen and (lower)alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred monomer for preparation of the styrenic resins for use in the invention. Compositions of polyphenylene ethers and styrene resins are described by Cizek, U.S. Pat. No. 3,383,435 which is incorporated by reference.

The styrene resins may include units derived from an alpha, beta-unsaturated cyclic anhydride of the formula $R^7$—C(H)$_n$----C($R^8$)----(CH$_2$)$_m$—$R^9$ wherein the dotted lines represent a single or double carbon-to-carbon bond, $R^7$ and $R^8$ taken together represents a C(=O)—O—(=O) (anhydride) linkage, $R^9$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-to-carbon double bond, and m is an integer of from 0 to about 10. Examples of such anhydrides include maleic anhydride, citraconic anhydride, itaconic anhydride, and the like.

Rubber may be used in the preparation of the styrene resins to upgrade the physical properties of these resins according to well known techniques. The rubber employed may be a polybutadiene rubber, butyl rubber, styrene-butadiene rubber, acrylonitrile rubber, ethylene-propylene copolymers, natural rubber, EPDM rubbers, polysulfide rubbers, polyurethane rubbers, epichlorohydrin rubbers and the like.

The styrene resins may be homopolymers or they may comprise 40 to 1 parts by weight of the alpha,beta-unsaturated cyclic anhydride, from 60 to 99 parts by weight of a styrene compound and from 0 to 25 parts, preferably from 5 to 15 parts by weight of rubber. A preferred styrene resin is high-impact rubber-modified polystyrene, e.g., polystyrene resin which contains about 5%–15% of polybutadiene rubber.

Furthermore, it is thought that polyphenylene ether resins produced by the process of this invention can subsequently be blended with other polymers or copolymers to form various mixtures and/or copolymers thereof. Non-limiting examples of the other polymers or copolymers are polyesters, polyamides, polyimides (e.g., poly(etherimides)), polyolefins, polycarbonates, copolyetheresters, and block copolymers (di and tri-block) of styrene and butadiene. General guidelines for preparing such materials are well known in the art.

These mixtures and copolymers, as well as the polyphenylene ether-styrenic resin blends mentioned above, can include various other additives which impart or enhance a variety of characteristics. Illustrative additives are flame retardants, drip retardants, dyes, pigments, colorants, lubricants, reinforcing agents, fillers, antistatic agents, heat stabilizers, ultraviolet light stabilizers, and plasticizers. Effective amounts of such additives are usually in the range, for each, of from about 0.1% by weight to about 50% by weight, based on the weight of the entire composition.

The novel process of the invention reaction is preferably carried out with air or oxygen, although mixtures of air or oxygen with inert gases besides nitrogen may be employed.

To carry out the process of the invention, typically, a suitable reaction vessel fitted with stirring means and heat removal means is charged with the solvent, the strong base solution, the primary or secondary amine, and the phase transfer catalyst. A stream of oxygen or air is introduced near the bottom of the reaction vessel, or the reaction mixture is agitated under oxygen or air, and the monomer is added gradually over a period of about 30–40 minutes. Polymerization is carried out preferably until the conversion of phenol monomer is about 90% but not in excess of about 95%. The polymer may be recovered from the reaction mixture according to standard procedures such as precipitation by a non-solvent.

The process of my invention and the preparation of the catalyst system therefor is illustrated by the following examples. Where indicated, the intrinsic viscosity (I.V.) reported was obtained in chloroform at a temperature of 25° C. and is reported in dl/gm units. Nitrogen analysis was carried out by the acid-base titration method.

To 41.5 ml of 6M aqueous sodium hydroxide, 5.0 g. of 4-bromo-2,6-dimethylphenol was added and dissolved completely with stirring at room temperature. Then 5 ml of toluene was added followed by 0.4222 g of tetrabutylammonium hydrogen sulfate, the phase transfer catalyst, with stirring. Then, 0.019 g of di-n-butylamine and 36.5 ml. of toluene were added with stirring. The entire contents of the vessel were then stirred in air at room temperature of 18–20 hours. After this time, glacial acetic acid was added to neutralize the remaining caustic. The water and organic phases were separated, and polymer was isolated from the organic phase by slow addition of this phase to stirred methanol. The precipitated polymer was removed by filtration, washed with methanol, and dried in vacuum. Similar experiments were run with other primary and secondary amines. The characteristics of the polymers made in these experiments are summarized in the following Table:

| Amine | IV (dl/g) | Wt. % N |
|---|---|---|
| piperidine | 0.23 | 0.081 |
| morpholine | 0.14 | 0.11 |
| t-butylamine | 0.61 | 0.057 |
| dibenzylamine | 0.45 | 0.092 |
| diphenylamine | 0.78 | 0.036 |
| diethylamine | 0.34 | — |
| di-n-propylamine | 0.37 | 0.075 |
| di-n-butylamine | 0.40 | 0.065 |
| di-n-pentylamine | 0.46 | 0.089 |
| di-n-hexylamine | 0.35 | — |
| di-n-octylamine | 0.68 | 0.049 |

Structural determination of the polymer products above by nmr shows that nitrogen is only incorporated as the end group and not elsewhere in the chain in contrast to the polyphenylene ethers made by the copper catalyzed processes of the prior art.

Figure 2:
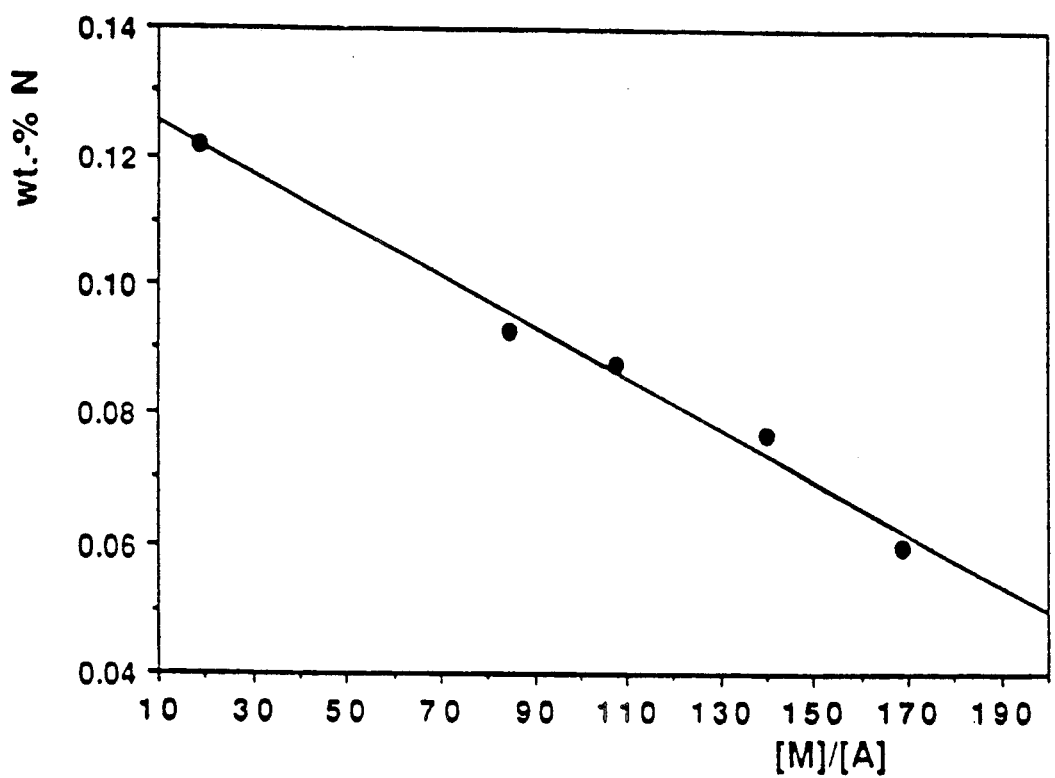
FIG. 2 is a graphical representation showing the relationship of weight-percent N in DBA polymers to changes in [M]/[A].

A further series of experiments was conducted as in the foregoing example but with varying amounts of di-n-butylamine. The intrinsic viscosity(I.V.), which is approximately proportional to molecular weight, was determined for the products of this series of experiments. The results are shown graphically in FIG. 1 of the accompanying drawings wherein the ordinate is intrinsic viscosity (IV, in dl/g) and the abscissa is the molar ratio of monomer (M=4-bromo-2,6-dimethylphenol) to amine (A=di-n-butylamine) ([M]/[A]). The plot suggests a logarithmic trend of IV vs. [M]/[A] and the general trend is to lower product molecular as monomer to amine mole ratio is lowered. Equimolar amounts of monomer and amine appear to prevent the reaction entirely. The relationship of wt.-% N in the polymers made in this series as a function of [M]/[A]further shows the relationship of molecular weight to [M]/[A]; since n.m.r. shows only one amino group per molecule of polymer, molecular weight must be inverse to nitrogen percentage. FIG. 2 wherein data from the same experimental series is plotted shows that the wt.-% N in the polymer product declines approximately linearly with increasing [M]/[A], so molecular weight must be increasing in an inverse relationship to [M]/[A]. By use of a preset ratio of [M]/[A], it is evident that the product molecular weight can be controlled.

What I claim is:

1. A process for producing a poly-2,6-dialkylphenylene ether resin, which comprises, subjecting the corresponding 2,6-dialkyl-4-halophenol to oxygen in the presence of a substantially water-immiscible solvent, an aqueous alkali, an effective polymerization catalyzing amount of a phase transfer agent, and a molecular-weight-controlling amount of an amine having at least one hydrogen on the amine nitrogen, the carbon atoms bound to this nitrogen being aliphatic carbon atoms.

2. The process of claim 1 wherein said phenol is selected from 4-halo-2,6-dimethylphenol and a mixture of 4-halo-2,6-dimethylphenol and 4-halo-2,3,6-trimethylphenol.

3. The process of claim 2 wherein said halo is chloro.

4. The process of claim 3 wherein said halo is bromo.

5. The process of claim 1 wherein said amine is selected from monoalkyl and dialkylamines wherein said alkyl groups are unbranched at the alpha position relative to the amine nitrogen.

6. The process of claim 1 wherein said amine is a dialkylamine wherein said alkyl is unbranched at the alpha position relative to the amine nitrogen.

7. The process of claim 1 wherein said amine is di-n-butylamine.

8. The process of claim 1 wherein said amine is a cyclic amine unbranched at the carbon atoms alpha to the amine nitrogen.

9. The process of claim 1 wherein said amine is morpholine.

10. The process of claim 1 wherein said amine is piperidine.

11. The process of claim 1 wherein said amine is used in an amount from 0.001 to slightly less than 1 mole per mole of said phenol.

12. The process of claim 1 wherein said amine is used in an amount from 0.005 to about 0.1 mole per mole of said phenol.

13. The process of claim 1 wherein said alkali is sodium hydroxide.

14. The process of claim 1 wherein said alkali is present at a ratio of from 5 to 10 moles per mole of said phenol.

15. The process of claim 1 wherein said phase transfer catalyst is a quaternary ammonium compound.

16. The process of claim 1 wherein said phase-transfer catalyst is a quaternary ammonium salt having a total of at least 10 carbon atoms in its alkyl radicals.

17. The process of claim 1 wherein said phase-transfer catalyst is a tetrabutylammonium salt.

18. The process of claim 1 wherein said solvent is an aromatic hydrocarbon.

19. The process of claim 1 wherein said solvent is toluene.

20. A process for producing a polyphenylene ether resin with controlled molecular weight which comprises the oxidative polymerization of 2,6-dimethyl-4-bromophenol in the presence of from 5 to 10 moles of sodium hydroxide per mole of said phenol, in the presence of from about 100 to 2000 ppm of a quaternary ammonium phase transfer catalyst, a solvent quantity of toluene and from 0.005 to 0.1 mole of an amine having at least one hydrogen on the amine nitrogen, the carbon atoms bound to this nitrogen being aliphatic carbon atoms.

21. A catalyst system for the oxidative polymerization of a 4-halo-2,6-dialkylphenol which comprises a substantially water-immiscible solvent, an aqueous alkali, an effective polymerization catalyzing amount of a phase transfer agent, and a molecular-weight-controlling amount of an amine having at least one hydrogen on the amine nitrogen, the carbon atoms bouund to this nitrogen being aliphatic carbon atoms.

22. A polyphenylene ether as produced by the process of claim 1.

23. A blend of a polyphenylene ether of claim 22 with a styrenic resin.

24. A product comprising the polyphenylene ether produced by the process of claim 1, and at least one additional polymer or copolymer selected from the group consisting of polyesters, polyamides, polyimides, polyolefins, polycarbonates, copolyetheresters, and block copolymers of styrene and butadiene.

25. A product comprising the polyphenylene ether produced by the process of claim 1, and further comprising effective amounts of at least one additive selected from the group consisting of flame retardants, drip retardants, dyes, pigments, colorants, lubricants, reinforcing agents, fillers, antistatic agents, heat stabilizers, ultraviolet light stabilizers, and plasticizers.

* * * * *